(12) United States Patent
Beaton et al.

(10) Patent No.: US 6,526,129 B1
(45) Date of Patent: *Feb. 25, 2003

(54) SYSTEM AND METHOD FOR COMMUNICATION MEDIA MANAGEMENT

(75) Inventors: Robert J. Beaton, Ottawa (CA); Peter M. Wells, Ottawa (CA)

(73) Assignee: Nortel Networks Limited, Ottawa (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,515

(22) Filed: May 2, 1997

(51) Int. Cl.[7] ............................................. H04M 11/00
(52) U.S. Cl. ................. 379/90.01; 379/88.23; 379/93.17; 379/221.01
(58) Field of Search ............................ 379/88.13, 88.01, 379/88.16, 88.23–88.25, 93.01–93.05, 93.17, 93.11, 93.21–93.25, 93.27, 100.08, 100.12–100.15, 199–200, 352–354, 355, 90.01, 221, 92.03–92.04, 210, 201; 709/229; 345/329–334; 370/352–356, 401, 422, 426

(56) References Cited

U.S. PATENT DOCUMENTS

| | | | |
|---|---|---|---|
| 4,734,931 A | * 3/1988 | Bourg et al. ............. 379/93.23 |
| 5,247,568 A | 9/1993 | Bergsman et al. ............. 379/67 |
| 5,457,738 A | * 10/1995 | Sylvan .................... 379/93.23 |
| 5,630,060 A | * 5/1997 | Tang et al. .............. 379/88.13 |
| 5,633,918 A | * 5/1997 | Mankovitz ............. 379/100.14 |
| 5,652,789 A | * 7/1997 | Miner et al. ................. 379/201 |
| 5,692,038 A | * 11/1997 | Kraus et al. ................. 379/210 |
| 5,724,406 A | * 3/1998 | Juster ...................... 379/88.23 |
| 5,740,230 A | * 4/1998 | Vaudreuil ................ 379/93.24 |
| 5,754,630 A | * 5/1998 | Srinivasan .................. 379/221 |
| 5,796,394 A | * 8/1998 | Wicks et al. ................. 345/329 |
| 5,812,865 A | * 9/1998 | Theimer et al. ......... 379/93.01 |
| 5,848,356 A | * 12/1998 | Jambhekar et al. ......... 379/355 |
| 5,850,433 A | * 12/1998 | Rondeau ..................... 379/201 |
| 5,930,338 A | * 7/1999 | McKendry et al. ......... 379/210 |
| 5,960,442 A | * 9/1999 | Pickering .................... 379/201 |
| 6,026,158 A | * 2/2000 | Bayless et al. .......... 379/93.23 |
| 6,091,808 A | * 7/2000 | Wood et al. ................. 379/201 |

FOREIGN PATENT DOCUMENTS

WO          WO 91/11874          8/1991

* cited by examiner

Primary Examiner—Curtis Kuntz
Assistant Examiner—George Eng
(74) Attorney, Agent, or Firm—Finnegan, Henderson, Farabow, Garrett & Dunner, L.L.P.

(57) ABSTRACT

A system and method for consolidating access to communication media into a single, configurable interface accessible by callers.

49 Claims, 13 Drawing Sheets

SYSTEM AND METHOD FOR COMMUNICATION MEDIA MANAGEMENT

BACKGROUND OF THE INVENTION

The present invention relates generally to managing communication media, and more specifically to consolidating communication media access into a single interface.

In recent years, the number of ways to contact a person has increased dramatically. In the past, people typically had only a home phone and a business phone. Today, people usually have at least two business or home phone lines, as well as a variety of other communication media at their disposal. These media include, for example, pagers, cellular phones, facsimile machines, voicemail, and E-mail. The more technologically sophisticated may even have access to video conferencing and the capability to receive video mail. Moreover, people often maintain parallel communication channels at home and at the office, such as a fax machine at each location, and a personal and business E-mail address.

This jumble of communication media presents imposing problems. First, a person must himself keep track of the various numbers or addresses associated with these media. He must also be meticulous in giving out this information to everyone he wishes to have it. It may be difficult to predict, however, who might need to contact him at a given time. For example, if a person owns a pager or cellular phone so that he may be reached in emergencies, there is no guarantee that the person needing to reach him during the emergency will have the numbers for those devices. Instead, the caller may just have the person's business or home phone number or, worse, no number at all.

Another problem arises when the numbers and addresses corresponding to the communication media change. For example, people change jobs and receive new work phone and fax numbers and E-mail addresses; they change residences and receive new phone numbers; and they change carriers for their cellular phones or pagers which may result in different numbers. The person then has the formidable task of notifying everyone of the changes.

With all these communication channels available, another problem people face is maintaining a certain amount of privacy. There may be times when an individual does not want to be interrupted by direct contact by anyone or by particular people, such as a salesperson. Currently, there is no uniform way to channel communications to particular unobtrusive devices, such as voicemail or E-mail, or to channel communications only from certain individuals to those devices.

On the caller's side, the number of communication media associated with a particular person causes similar problems. A caller must keep track of the various numbers and addresses of the person he is trying to reach, often not knowing if they have changed or become outdated. Also, many devices have their own operating protocols, requiring a caller to know not only the number or address of the device, but how to interact with it.

Moreover, callers may not even be aware of all the ways to contact an individual. As discussed above, in an emergency, a caller would likely want to know a person's cellular phone number. In reality, the caller may not even know the person has a cellular phone. Or, conversely, if the caller does not have an urgent need to contact an individual, he may just want to leave a voicemail or E-mail, but does not know the appropriate number or address to access those media.

In light of the foregoing, there is a need for a system to consolidate communication media associated with an individual into a central, configurable gateway that callers can access.

SUMMARY OF THE INVENTION

Accordingly, systems and methods consistent with the present invention substantially obviate the problems and disadvantages that accompany the many modes of communication associated with an individual.

In accordance with the purpose of the invention, as embodied and broadly described, a system consistent with this invention includes means for receiving information from a caller identifying a person to be contacted, means for presenting a list of available communication media that the caller can use to contact the person, means for receiving a selection of one of the communication media from the caller, and means for activating the selected communication medium.

Another system consistent with this invention includes means for presenting a plurality of communication media associated with a user, means for receiving settings from the user for the plurality of communication media, means for storing the settings, and means for configuring caller access to the plurality of communication media based on the settings.

A method consistent with this invention includes the steps of receiving information from a caller identifying a person to be contacted, presenting a list of available communication media that the caller can use to contact the person, receiving a selection of one of the communication media from the caller, and activating the selected communication medium.

Another method consistent with this invention includes the steps of presenting a plurality of communication media associated with a user, receiving settings from the user for the plurality of communication media, storing the settings, and configuring caller access to the plurality of communication media based on the settings.

Other features and advantages of the invention will be set forth in the description which follows, and in part will be apparent from the description, or may be learned by practice of the invention. The objectives and other advantages of the invention will be realized and attained by the system and method particularly pointed out in the written description and claims hereof as well as the appended drawings.

Both the foregoing general description and the following detailed description are exemplary and explanatory only, and are intended to provide further explanation of the invention as claimed. The accompanying drawings provide a further understanding of the invention and are incorporated in and constitute a part of this specification. They illustrate embodiments of the invention, and together with the description serve to explain the principles of the invention.

DETAILED DESCRIPTION

Reference will now be made in detail to the present preferred embodiments of the invention, an example of which is illustrated in the accompanying drawings. Wherever possible, the same reference numbers will be used throughout the drawings to refer to the same or like parts.

A. OVERVIEW

The software program consistent with the present invention consolidates communication media into a single interface or gateway. Users manage and filter all their communication media through this one interface. Callers then locate people through the interface and choose a communication medium available to them to contact a user.

The program runs on a central server, Internet site, private intranet, or dial-up service that people access through any suitable communication link, such as by modem, cable access, or wireless telecommunication. Alternatively, there may be a combination of local and central processing to run the program. Users access the server to configure their communication media. In particular, users choose which communication devices they have, such as, for example, a home phone, business phone, cellular phone, pager, fax machine, voicemail, or E-mail. They provide the server with the number or address for each of these devices. Alternatively, information about communication devices can be provided by service providers. Then, users configure the devices by indicating which individuals or groups of individuals will have access to particular devices at particular times. The server stores this configuration information.

Callers access the server to contact users. When a caller enters a user's name, the server accesses the stored communication media configuration for that user, and, based on the user's preferences, presents the devices available to the caller to make contact. The caller then selects a particular device, which the server engages. The caller need not know the number or address associated with the chosen communication medium.

To manage asynchronous communications for a user, such as voicemail or E-mail, the program preferably has a message center. The message center keeps track of the number of messages sent to particular asynchronous device along with other summary information, such as who sent the message and when.

B. IMPLEMENTATION

Figure 1:
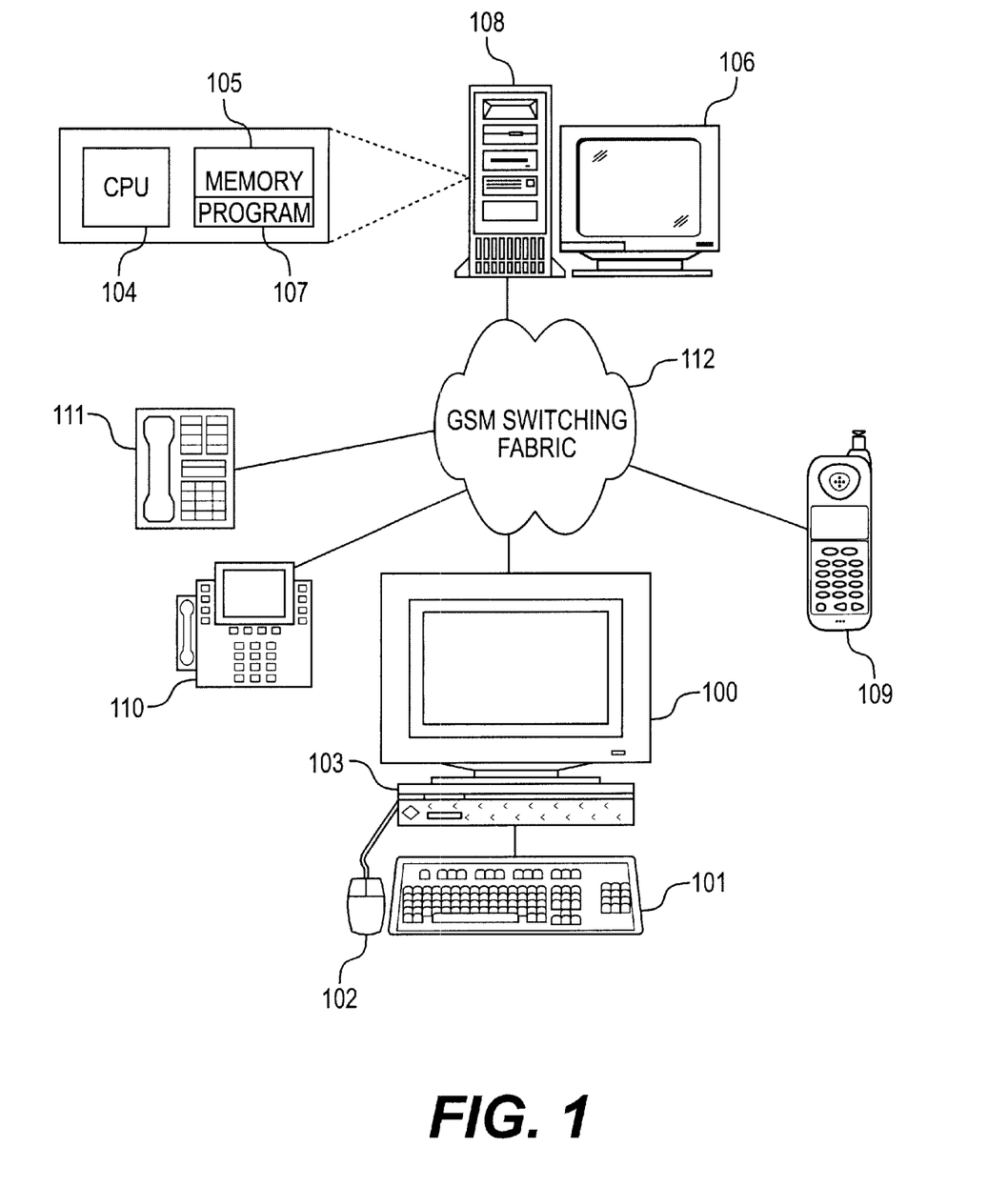
FIG. 1 is a diagram showing a computer system consistent with an implementation of the present invention.

FIG. 1 is a diagram of a system that can be used to carry out an implementation consistent with the present invention. A user connects to a central server 106 through any suitable means, such as GSM switching fabric 112. The user can use a variety of devices to access a server 106, such as a mobile phone 109, an Analog Display Services Interface (ADSI) telephone 110, or an ordinary telephone 111. The user could also use computer 103, with monitor 100, keyboard 101 and mouse 102 to interface with the server. Central server 106 has a processing unit 108 including a CPU 104 and a memory 105 containing various programs and data, including a program 107. Program 107 runs the interface, collecting the communication media configuration data and coordinating contact between callers and users. For explanatory purposes, we assume that the user communicates with server 106 using computer 103.

Figure 2:
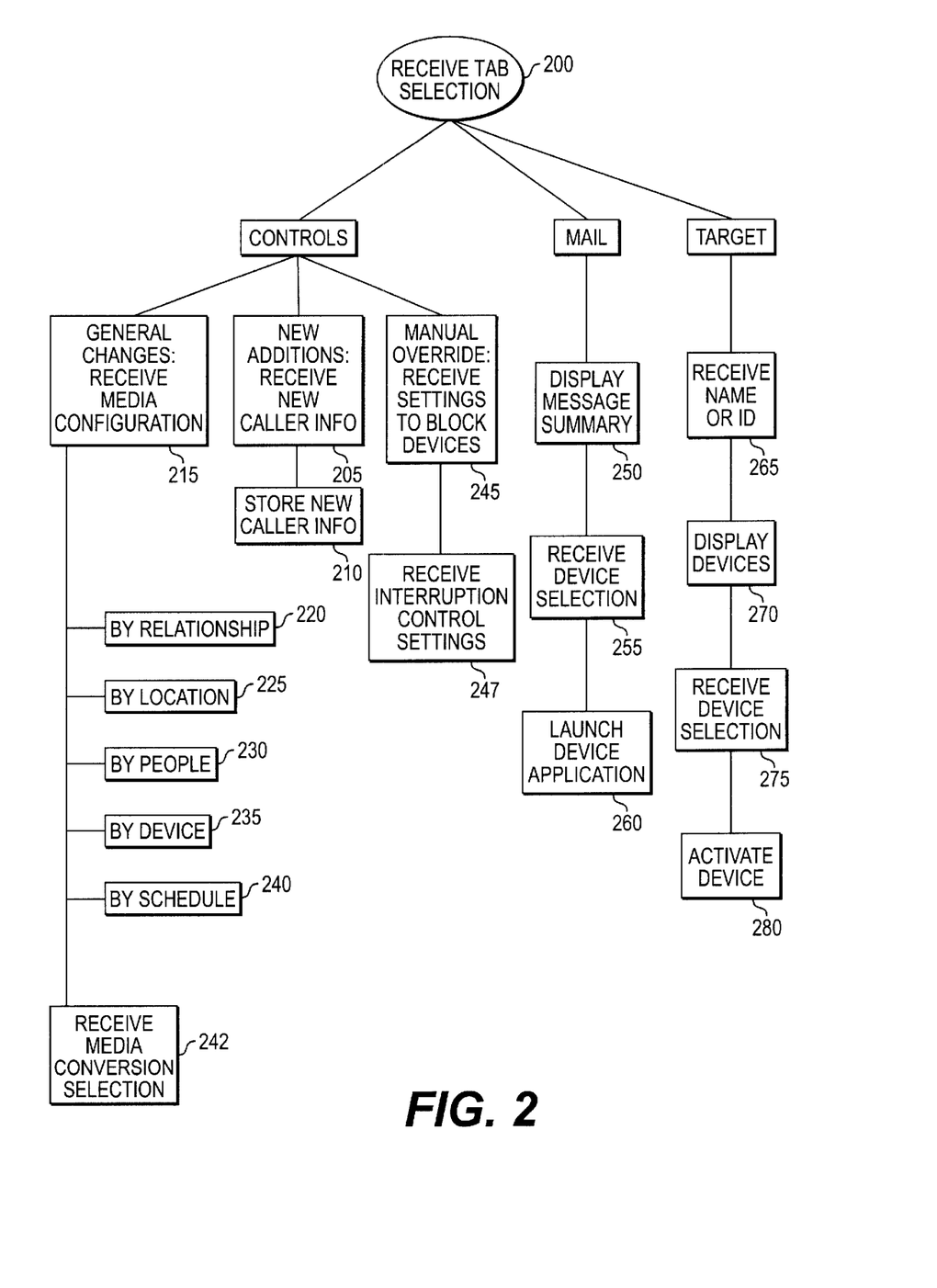
FIG. 2 is a generalized flowchart showing the logical steps consistent with an implementation of the present invention.

FIG. 2 depicts a generalized flowchart showing the progression of program 107 and will be referenced throughout the description. Program 107 has three general parts shown in FIG. 3 by tabs 301, 302 and 303. Tab 301 is a "controls" part that allows users to configure their communication devices; tab 302 is a "mail" part that acts as a message center for asynchronous communications; and tab 303 is a "target" part that allows callers to target, or select, users they wish to contact.

1. Controls

Figure 3:
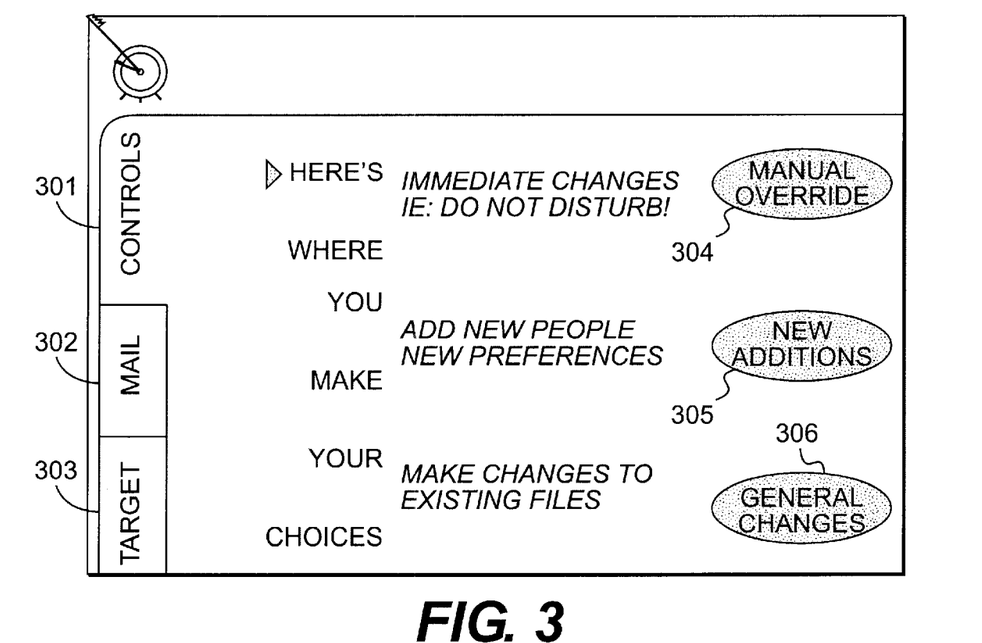
FIG. 3 is a drawing of a user control screen.

FIG. 3 depicts the first screen shown when the user selects tab 301 (step 200) by clicking on it with mouse 102. From this screen, the user has three choices, shown as buttons 304, 305, and 306. Selecting button 305, labeled "New Additions," takes the user to the screen shown in FIG. 4. Here, the user can add individuals to his database of potential callers. The user enters a person's name or identification number in box 412 (step 205) and selects enter button 414 to update his database of users (step 210). The user can also select button 416 to enter more information about the person such as his address or other personal data.

Figure 4:
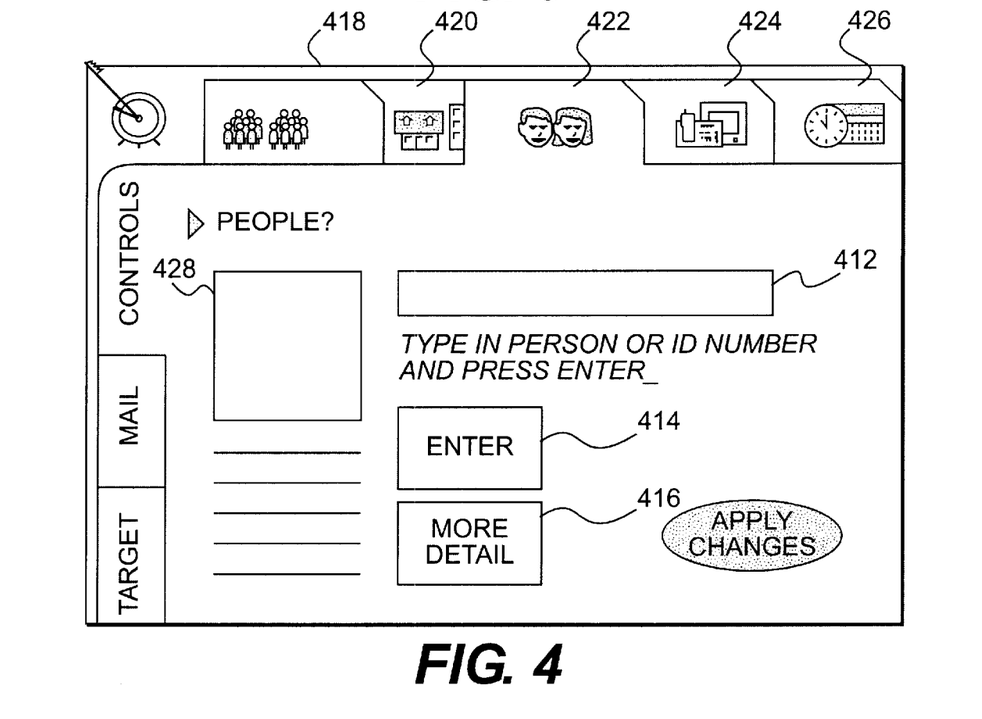
FIG. 4 is a drawing of a user input screen used to add people to the access control database.

For explanatory purposes, suppose the user had entered "Joe Smith, Manager of Widget Sales" in box 412 and transported a bitmap photo of Joe Smith in box 428, which program 107 stores into the database. The user will then have to configure his communication media to indicate how and when he wishes Joe Smith to be able to contact him. Tabs 418, 420, 422, 424, and 426 provide access to various filtering and configuration capabilities.

Figure 5:
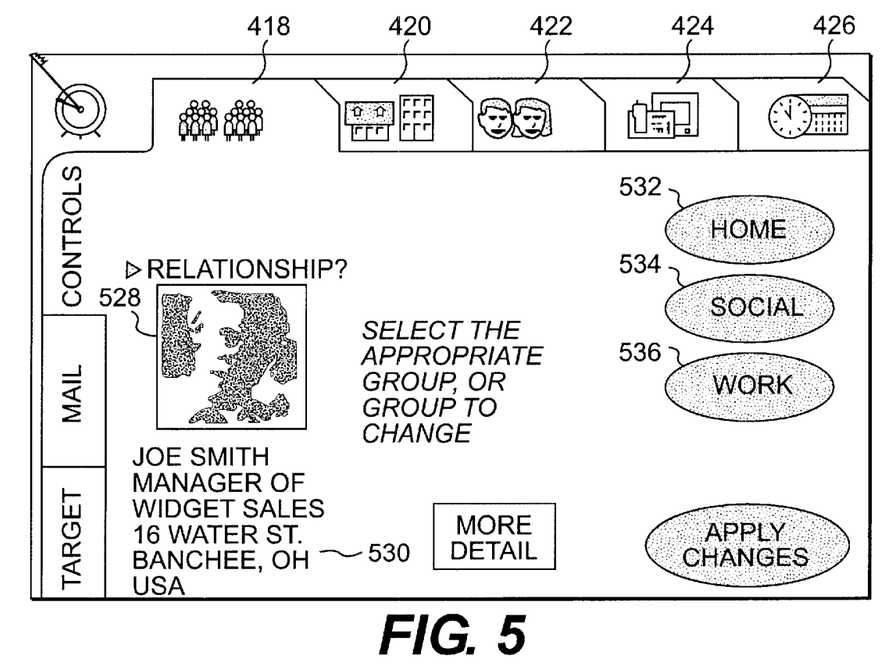
FIG. 5 is a drawing of a user control screen used to specify the nature of the relationship with an individual.

Selecting tab 418 takes the user to the screen shown in FIG. 5. Note that program 107 now displays a picture 528 and brief description 530 of Joe Smith to indicate for who the user is configuring his communication media. This screen allows the user to choose how Joe Smith is related to him (step 220). For example, if Joe is a relative, the user would select home button 532; if Joe is a social acquaintance, the user would select social button 534; or if Joe is someone work-related, the user would select work button 536. These categories of individuals are configurable by the user.

Suppose Joe Smith is work-related and the user selects button 536. This would associate with Joe Smith a predetermined level of accessibility specified by the user. If satisfied with giving Joe Smith the same access as any work-related individual, the user's configuration would be complete. Otherwise, the user could continue with more detailed filtering.

Figure 6:
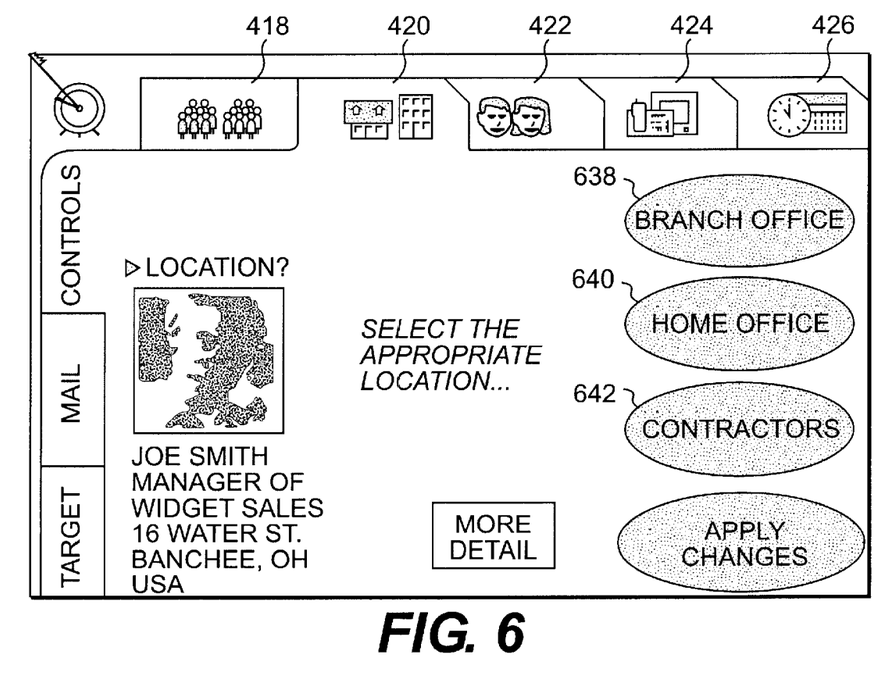
FIG. 6 is a drawing of a user control screen used to specify the location of an individual.

For example, suppose the user selected tab 420. This screen, shown in FIG. 6, allows the user to further define Joe Smith's communication access by choosing his location (step 225). For example, selecting button 638 indicates that Joe Smith is part of the user's branch office, button 640 indicates that he is part of the home office, and button 642 indicates that he is a contractor. As with tab 418, these groups are configurable by the user. Suppose Joe Smith is a contractor, and the user selects button 642. Joe Smith now has the same predetermined level of accessibility as any contractor. If the user wished to continue with more detailed filtering, he could proceed with tab 422.

Figure 7:
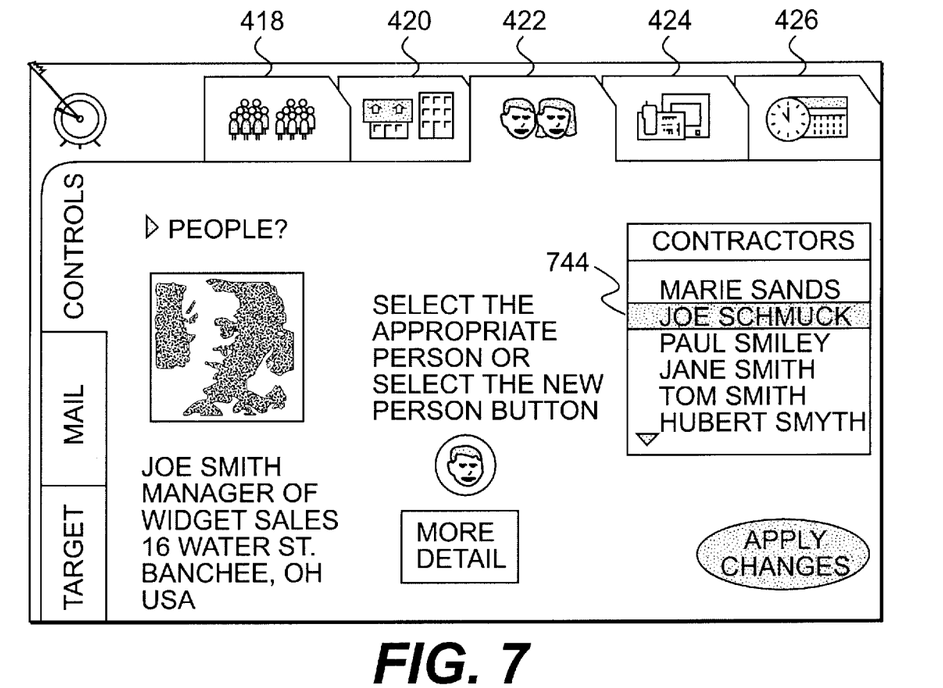
FIG. 7 is a drawing of a user control screen used to associate settings corresponding to one individual with another.

Selecting tab 422 causes program 107 to display the screen shown in FIG. 7. In this screen, program 107 displays a list 744 of other contractors the user has previously entered. The user may wish to give Joe Smith communication access equivalent to that of one of these previously entered individuals. To do this, the user would select a name from list 744 (step 230).

Figure 8:
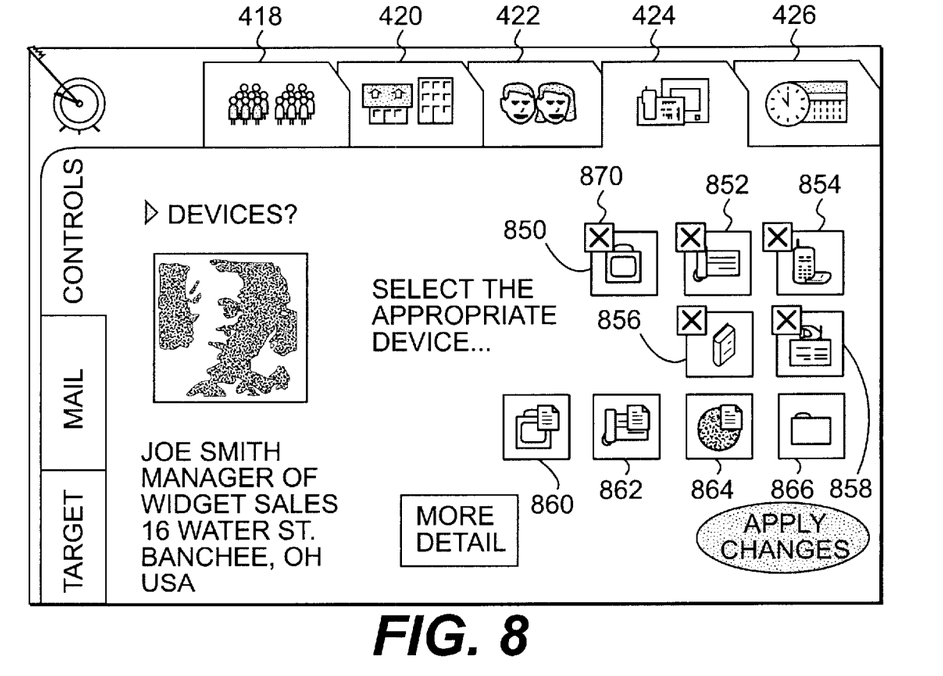
FIG. 8 is a drawing of a user control screen used to configure device access.

The user may continue by selecting tab 424, taking him to the screen shown in FIG. 8. Here, program 107 displays all the communication devices associated with the particular user. There is a video conferencing button 850, a desktop phone button 852, a mobile phone button 854, a pager button 856, a fax button 858, a video mail button 860, a voicemail button 862, an E-mail button 864, and a document sharing button 866. The "X" 870 indicated in the upper left corner of some devices indicates that those devices will not be available to Joe Smith to contact the user. The user could change Joe Smith's access by selecting any of these devices (step 235). Selecting a blocked device removes X 870 from the corner of the button, indicating that Joe Smith may use the device to contact the user. Selecting an unblocked device adds X 870 to the corner of the button, indicating that the device is no longer available to Joe Smith.

Figure 9:
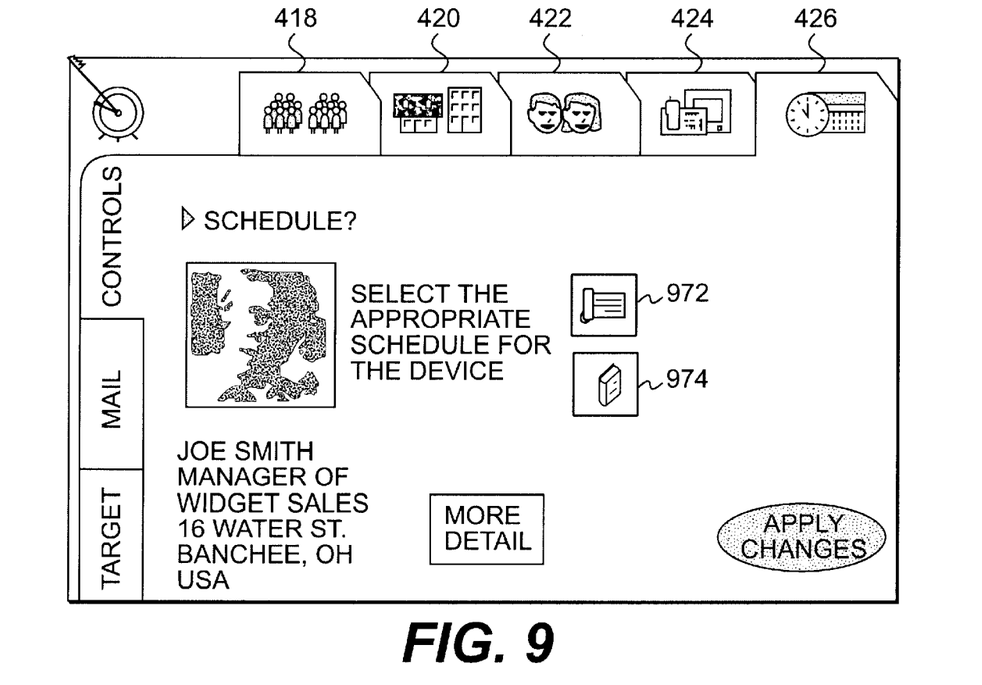
FIGS. 9–10 are drawings of user control screens used to specify schedules associated with device access.
Figure 10:
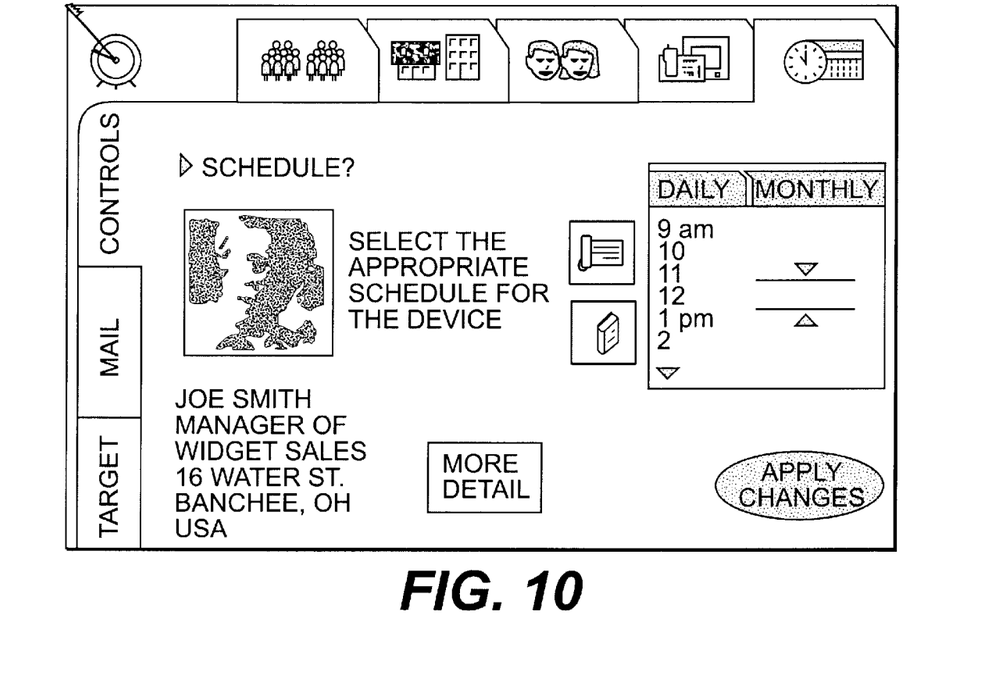

The user could specify greater level of detail of Joe Smith's access by selecting tab 426. Shown in FIG. 9, this screen allows the user to select a particular schedule that each unblocked device from tab 424 will be available. The user selects the particular device by choosing, for example, button 972 or 974. Then, in the screen shown in FIG. 10, the user can specify particular times of day, or days of the month in which that particular device will be available (step 240).

The user has now completed the configuration for Joe Smith's communication media access. As discussed above, the user may proceed through as many or as few levels of filtering as he wishes. Alternatively, the user may proceed through the levels of filtering in any order to set general defaults for communication access.

Figure 11:
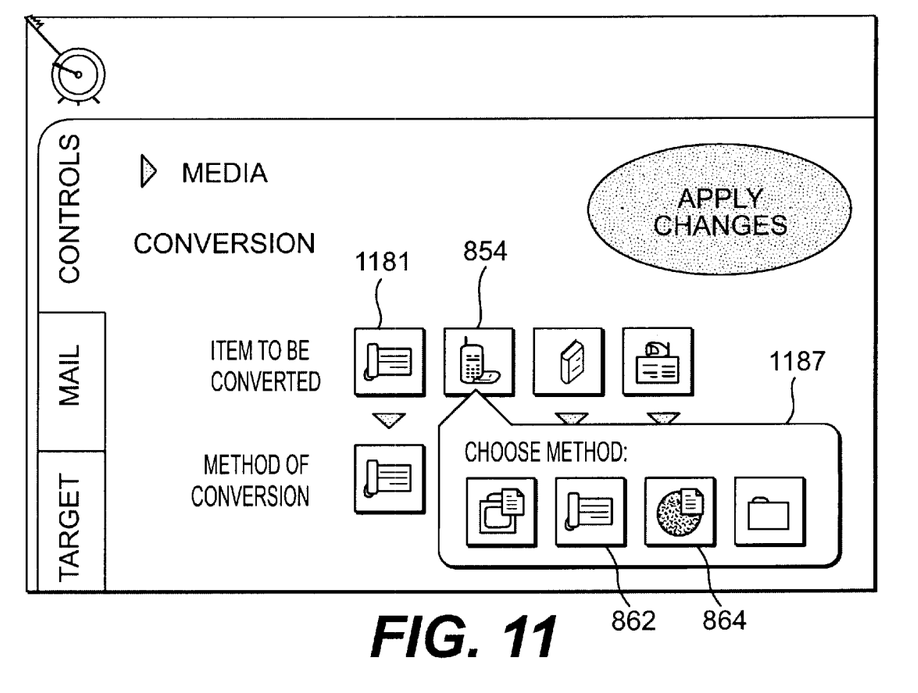
FIG. 11 is a drawing of a media conversion screen used to select conversion of communications from one medium to another.

Returning to the screen shown in FIG. 3, the user may select general changes button 306 (step 215) to change any existing set of preferences. Preferably, the general changes section also includes a screen allowing users to convert messages from one type to another, or to redirect messages to different devices (step 242). An example of a screen providing this capability is shown in FIG. 11. The program presents a list 1181 of communication media available to be converted. When the user selects a particular medium, such as cellular phone 854, program 107 displays a bubble 1187 listing the methods of conversion available for that medium. For example, the user could select email icon 864 as the method of conversion for cellular phone calls. In that case, program 107 would use a speech recognition algorithm to convert the cellular phone call into a text format suitable for use in email. Or the user could select voice mail icon 862 as the method of conversion, such that incoming cellular phone calls are routed to the user's voice mail system. The conversion of media is also useful where a user does not have a particular communications device available to him. Suppose, for example, a user does not have an email address, but someone wishes to send him an email. In this case, the user could choose that incoming emails be converted to faxes.

Figure 12:
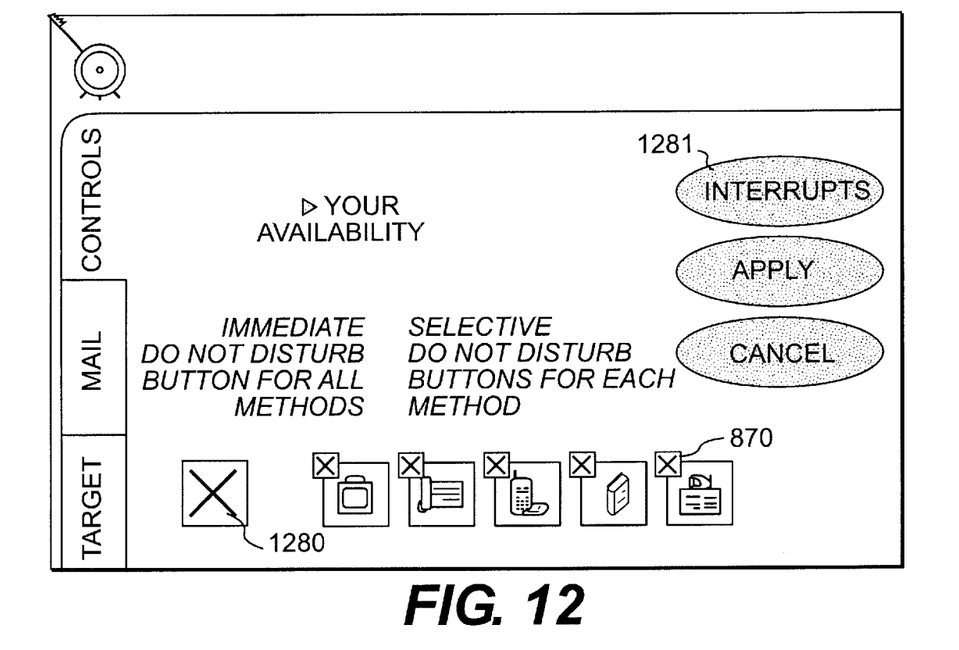
FIG. 12 is a drawing of a user control screen used to manually override settings entered in other user control screens.

Again returning to the screen shown in FIG. 3, the user may select manual override button 304 (step 245), causing program 107 to display the screen shown in FIG. 12. Here, the user may temporarily override general settings if, for example, he wanted privacy for a certain period of time. Clicking on large X 1280 routes all forms of immediate communications to the asynchronous methods. Or, the user may selectively activate or disable certain devices by selecting them. As before, the X 870 in the corner of the buttons indicates which devices are unavailable.

Figure 13:
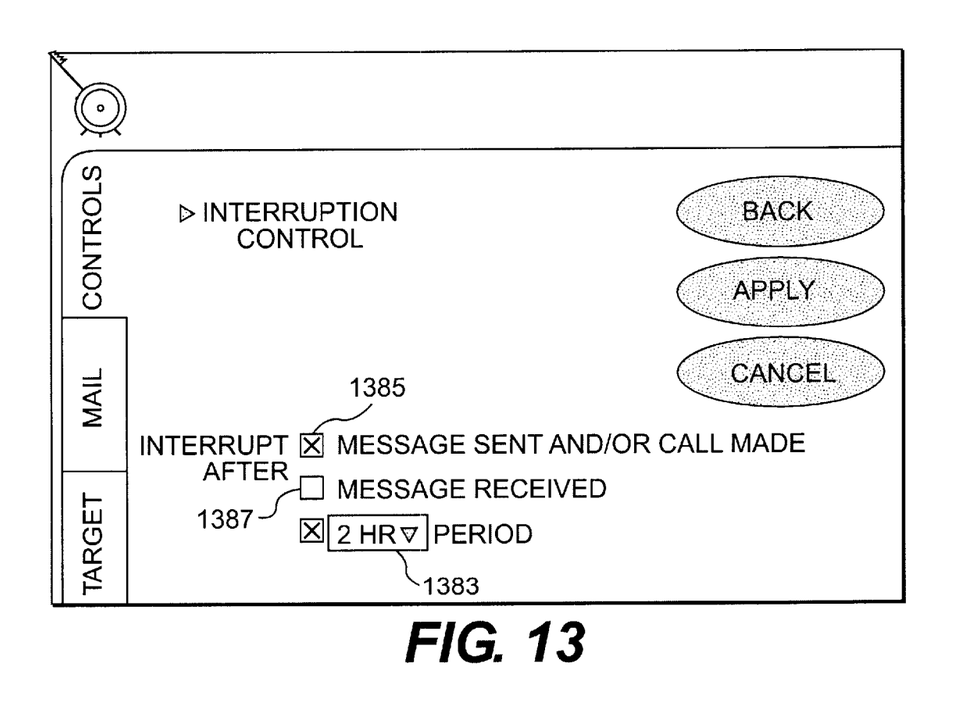
FIG. 13 is a drawing of an interruption control screen used to control the timing of incoming communications.

From FIG. 12, the user may select Interrupts button 1281, causing the program to display the screen shown in FIG. 13. From this screen, the program provides users the ability to control the number and type of communications they will receive during certain time periods (step 247). For example, a user may be engaged in focused work, during which he does not want to be interrupted. To that end, the program preferably allows the user to block all incoming communications for a selectable amount of time, shown by selectable box 1383. Or, if the user takes a break to initiate a call or send an asynchronous communication, the program can take advantage of this break in the user's work to update him with received communications. This option is selectable through box 1385. Finally, the user can configure the program to allow certain high priority communications to interrupt his work, while filtering other lower priority communications. The user selects box 1387 to activate this option.

2. Mail

Figure 14:
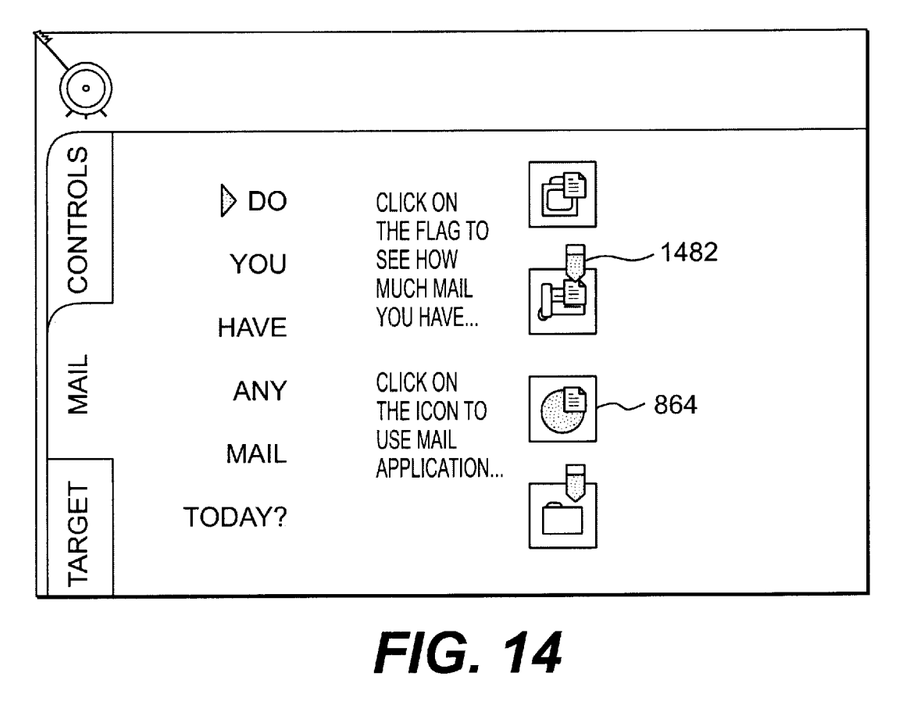
FIG. 14 is a drawing of a screen providing user access to mail functions.
Figure 15:
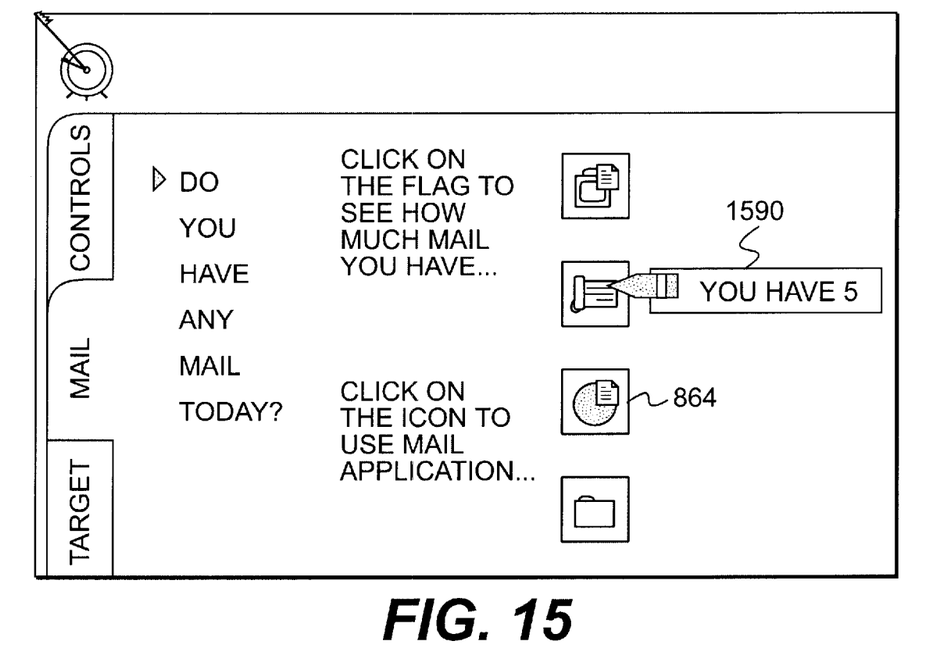
FIG. 15 is a drawing of a screen providing the user with message information.

From FIG. 3, selecting mail tab 302 takes the user to the screen shown in FIG. 14. This screen serves as a message center from which the user can send and receive messages, and manage his asynchronous devices such as voicemail, E-mail, video mail, and document sharing. A flag 1482 on a button indicates that the device has a message waiting. Selecting the flag gives the user information about how many messages callers have left on that device, as shown by box 1590 in FIG. 15, or a brief description including the caller's name and time of message (step 250). This would allow the user to determine whether he wished to view the message before launching specific applications. Selecting a button (step 255) launches an application (step 260) allowing the user to access that particular device. For example, selecting E-mail button 864 would launch a program such as Microsoft Mail, allowing the user to compose and send an Email message.

3. Target

Figure 17:
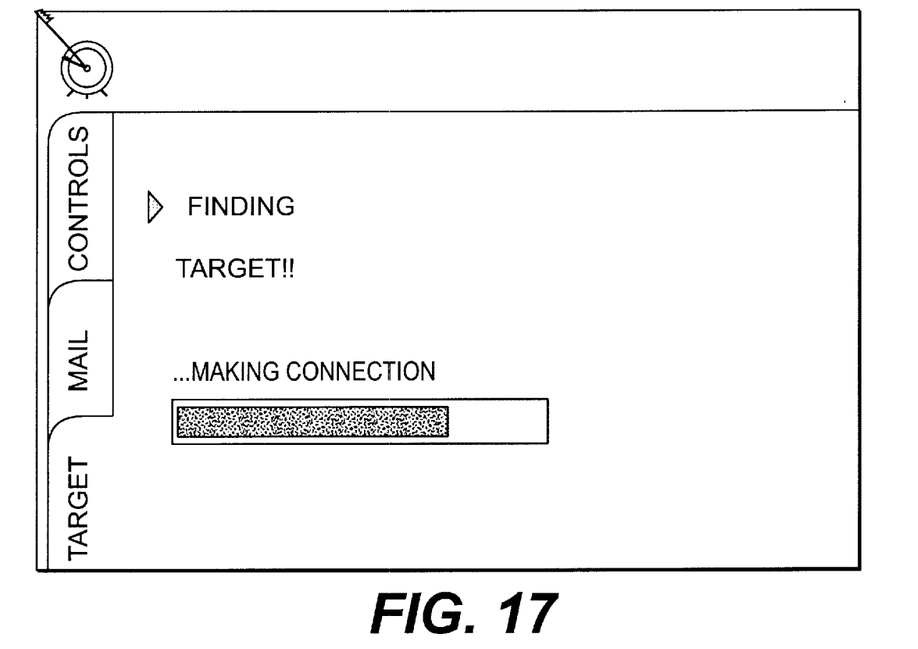
FIG. 17 is a drawing of a display of the program finding a target.
Figure 18:
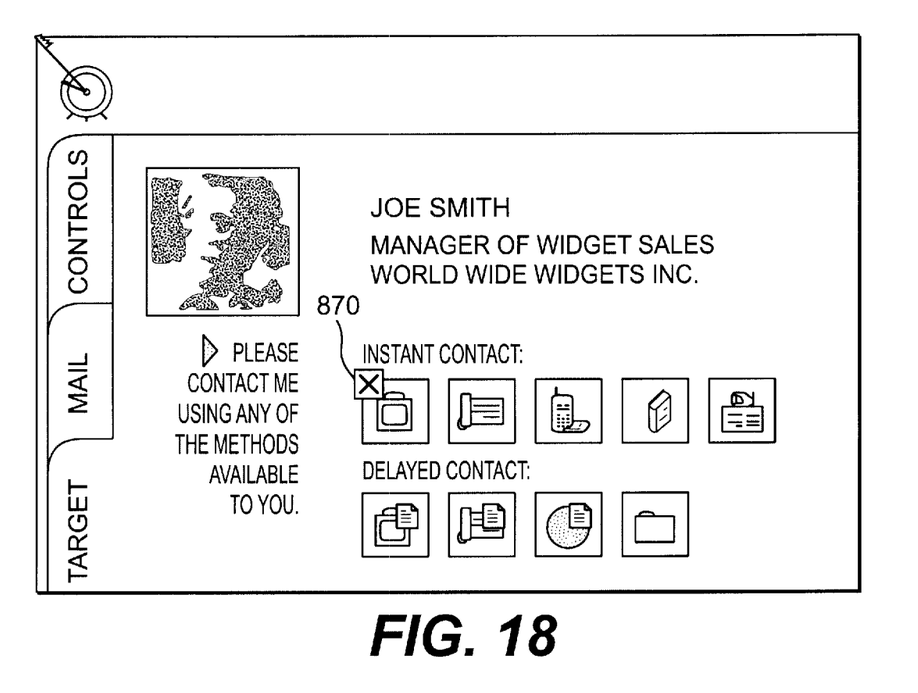
FIG. 18 is a drawing of a display of devices available to contact the target.

From FIG. 3, a caller selects tab 303 to target, or attempt to contact, a particular user. Program 107 then displays the screen shown in FIG. 16. The caller enters a user's name or identification number (step 265) he wishes to contact in box 384. Then, selecting make contact button 1684 takes the user to the screen shown in FIG. 17. Program 107 accesses the user's profile and presents the results in the screen shown in FIG. 18. Program 107 displays all communication devices associated with the user (step 270). Based on the particular access the user has set for the caller, certain devices may not be available to the caller. These devices are indicated by X 870 in the upper left hand corner of the button associated with the device. The screen in FIG. 18 could also display generalized greetings or other messages depending on caller attributes.

Figure 19:
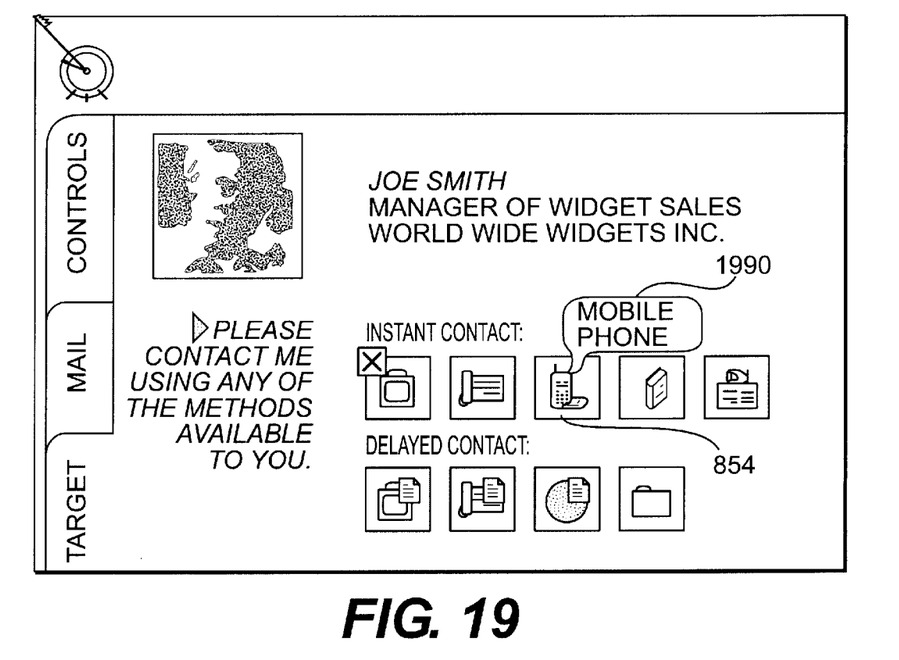
FIG. 19 is a drawing of a display of a help function for the screen shown in FIG. 16.

The caller can contact the user by selecting the desired form of communication (step 275) which activates the selected device (step 280). For synchronous forms of communication, program 107 initiates contact by dialing the corresponding number. For asynchronous communication, program 107 launches the appropriate application to allow the caller to leave a message for the user. As shown in FIG. 19, program 107 preferably provides a level of visual assistance to the caller whereby a balloon 1990 appears over a button when the caller leaves his cursor over it. For example, balloon 1990 identifies button 854 as corresponding to a mobile phone.

Figure 16:
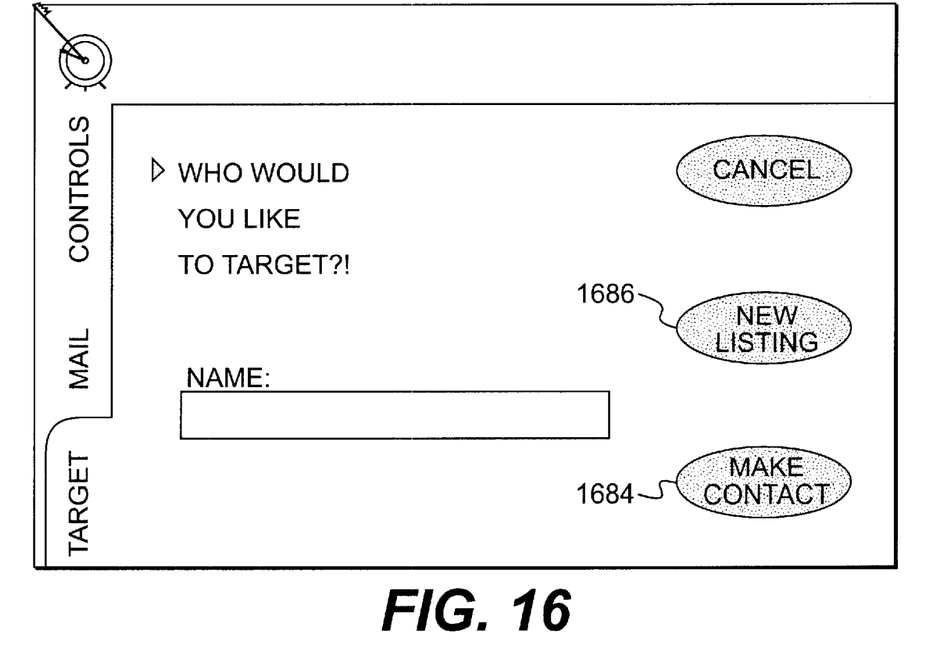
FIG. 16 is a drawing of a caller screen where a caller can specify a target.
Figure 20:
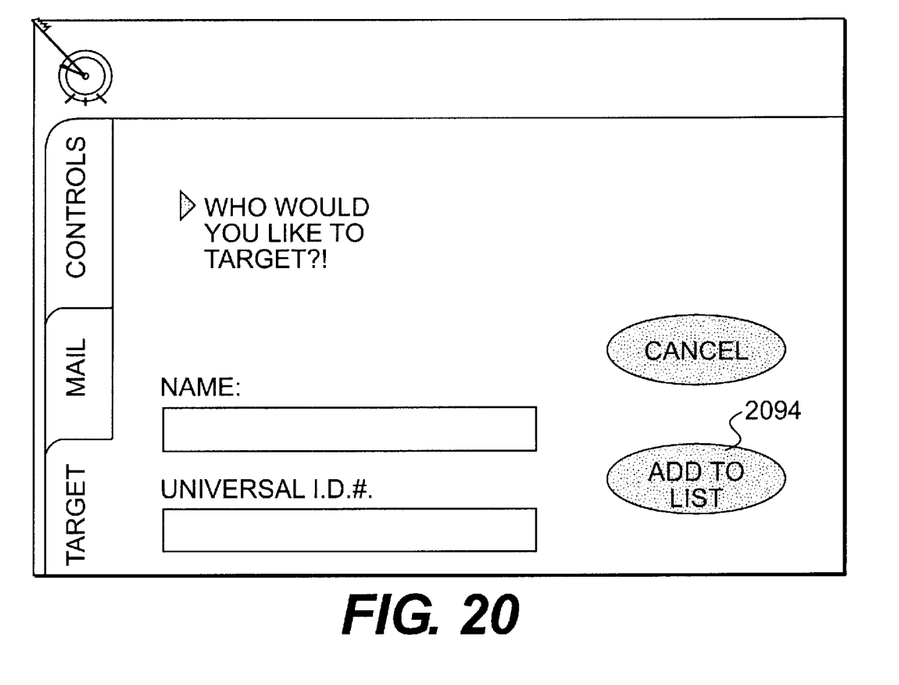
FIG. 20 is a drawing of a display where new targets can be added to a list.
Figure 21:
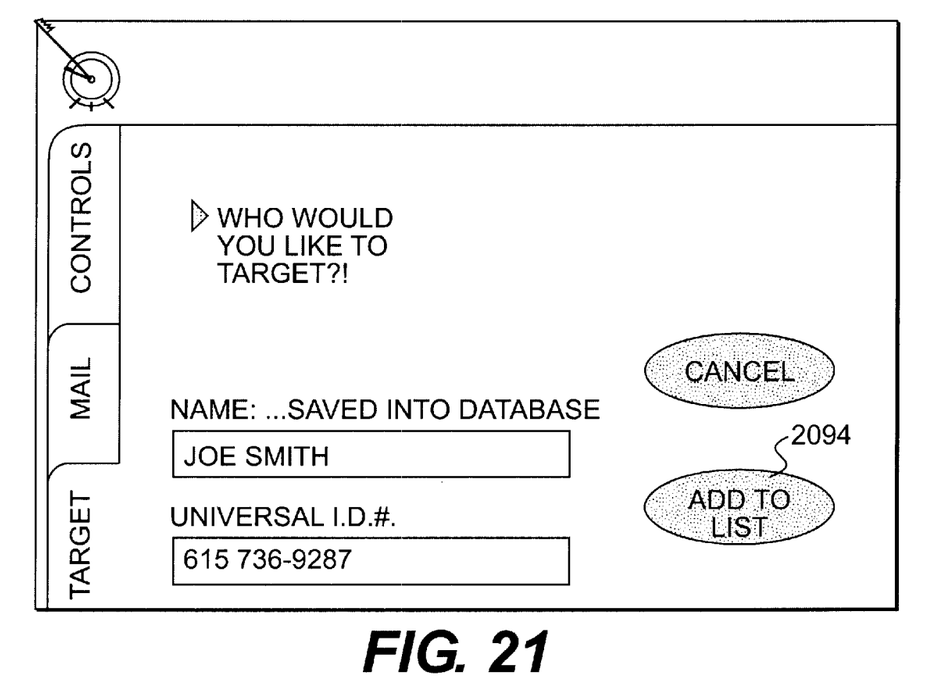
FIG. 21 is a drawing of a display showing a saved new target.

From the screen shown in FIG. 16, the user may select new listing button 1686, taking the user to the screen shown in FIG. 20. If the user has not previously called a user, he could enter that user's name and identification number, as shown in FIG. 21, and select add-to-list button 2094 to add the name to a list of people the user calls. In the future, then, the user would only have to enter the name of the user to contact him.

It will be apparent to those skilled in the art that various modifications and variations can be made in the present invention without departing from its spirit or scope. For example, instead of running on a central server, program 107 could run on a local device and transfer configuration information to the central server for central storage and access. Thus, it is intended that the present invention cover the modifications and variations of this invention provided they come within the scope of the appended claims and their equivalents.

We claim:

1. A method for a caller using an interface to contact a recipient comprising the steps of:
   receiving information in the interface of the caller identifying a recipient to be contacted;
   presenting on the interface a list of communication media received from a remote central processor, associated with the recipient, and acceptable to the recipient based on communication preferences predefined by the recipient for that caller;
   receiving a selection in the interface for one of the communication media in the list acceptable for contact with the recipient; and
   initiating the selected one communication media allowing the caller to contact the recipient through the interface.

2. The method of claim 1 wherein the step of presenting includes the step of
   presenting a list of available synchronous communication media.

3. The method of claim 2 wherein the step of presenting includes the step of
   presenting a list of synchronous communication media including a pager, a telephone, a cellular phone, a facsimile machine, or video conferencing.

4. The method of claim 1 wherein the step of presenting includes the step of
   presenting a list of available asynchronous communication media.

5. The method of claim 4 wherein the step of presenting includes the step of
   presenting a list of asynchronous communication media including E-mail, voicemail, video mail, or document sharing.

6. The method of claim 4 further including the step of
   storing summary information about messages sent to the asynchronous media.

7. The method of claim 1 wherein the step of activating the selected communication medium includes the step of
   launching an application to access the medium.

8. The method of claim 1 further including the step of
   storing the information received from the caller.

9. A method for managing communication media through an interface comprising the steps of:
   presenting a plurality of communication media associated with a recipient to the interface;
   receiving settings in a remote central processor from the recipient for the plurality of communication media, wherein the settings include caller access information associated with a particular communication media;
   storing the settings; and
   configuring caller access to the plurality of communication media based on the settings, such that a caller requesting to communicate with the recipient is presented with a list of communication media received from the remote central processor, associated with the recipient, and acceptable to the recipient based on communication preferences predefined by the recipient for that caller.

10. The method of claim 9 wherein the step of receiving settings includes the step of
    receiving settings identifying times that the communication media are available.

11. The method of claim 9 wherein the presenting step includes the step of
    presenting a plurality of synchronous and asynchronous communication media associated with the user.

12. The method of claim 11 further including the step of
    presenting a summary of messages received by the asynchronous communication media.

13. The method of claim 9 further including the step of
    receiving information identifying callers.

14. The method of claim 13 further including the step of
    storing the received information.

15. The method of claim 13 wherein the step of
    receiving settings includes the step of receiving settings for a plurality of callers.

16. The method of claim 13 wherein the step of receiving settings includes the step of
    receiving settings indicating the caller's relationship to the user.

17. The method of claim 13 wherein the step of receiving settings includes the step of
    receiving settings indicating the caller's location.

18. The method of claim 9 wherein the receiving step includes the step of
    receiving settings for converting communications from one medium to another.

19. The method of claim 9 wherein the receiving step includes the step of receiving selections for redirecting communications from one medium to another.

20. The method of claim 9 wherein the receiving step includes the step of receiving selections for blocking access to communications media.

21. The method of claim 13 wherein the receiving step includes the step of receiving selections to control a timing of incoming messages.

22. The method of claim 21 wherein the step of receiving selections to control the timing of incoming messages includes the step of:

receiving a selection to hold all incoming communications until the user initiates a communication.

23. The method of claim 21 wherein the step of receiving selections to control the timing of incoming messages includes the step of:

receiving a selection to hold all incoming communications for a predetermined time.

24. The method of claim 21 wherein the step of receiving selections to control the timing of incoming messages includes the step of:

receiving a selection to hold all incoming communications until a communication of a predetermined priority is received.

25. An interface for contacting a person comprising:

means for receiving information in the interface of a caller identifying a recipient to be contacted;

means for presenting on the interface a list of communication media received from a remote central processor, associated with the recipient, and acceptable to the recipient based on communication preferences predefined by the recipient for that caller;

means for receiving a selection in the interface for one of the communication media in the list acceptable for contact with the recipient; and means for initiating the selected one communication media allowing the caller to contact the recipient through the interface.

26. The system of claim 25 wherein the presenting means includes means for presenting a list of available synchronous communication media.

27. The system of claim 26 wherein the presenting means includes means for presenting a list of synchronous communication media including a pager, a telephone, a cellular phone, a facsimile machine, or video conferencing.

28. The system of claim 25 wherein the presenting means includes means for presenting a list of available asynchronous communication media.

29. The system of claim 28 wherein the presenting means includes means for presenting a list of asynchronous communication media including E-mail, voicemail, video mail, or document sharing.

30. The system of claim 28 further including the step of storing summary information about messages sent to the asynchronous communication media.

31. The system of claim 25 wherein the activating means includes means for launching an application to access the medium.

32. The system of claim 25 further including means for storing the information received from the caller.

33. A central processor for managing communication media comprising:

means for presenting a plurality of communication media associated with a recipient;

means for receiving settings from a user remotely communicating with the central processor for the plurality of communication media, wherein the settings include caller access information associated with a particular communication media;

means for storing the settings; and means for configuring caller access to the plurality of communication media based on the settings, such that a caller remotely communicating with the central processor and requesting to communicate with the recipient, is sent a list of communication media associated with the recipient and, acceptable to the recipient based on communication preferences predefined by the recipient for that caller.

34. The system of claim 33 wherein the means for receiving settings includes:

means for receiving settings identifying times that the communication media are available.

35. The system of claim 33 wherein the means for presenting includes means for presenting a plurality of synchronous and asynchronous communication media.

36. The system of claim 35 further including means for presenting a summary of messages received by the asynchronous communication media.

37. The system of claim 33 further including means for receiving information identifying communication media associated with the user.

38. The system of claim 33 further including means for receiving information identifying callers.

39. The system of claim 38 further including means for storing the received information.

40. The system of claim 38 wherein the means for receiving settings includes means for receiving settings for a plurality of callers.

41. The system of claim 38 wherein the means for receiving settings includes means for receiving settings indicating the caller's relationship to the user.

42. The system of claim 33 wherein the means for receiving settings includes means for receiving settings for converting communications from one medium to another.

43. The system of claim 33 wherein the means for receiving settings includes means for receiving selections for redirecting communications from one medium to another.

44. The system of claim 38 wherein the means for receiving settings includes means for receiving settings indicating the caller's location.

45. The system of claim 33 wherein the means for receiving settings includes means for receiving selections for blocking access to communications media.

46. The system of claim 38 wherein the means for receiving settings includes means for receiving selections to control a timing of incoming messages.

47. The system of claim 46 wherein the means for receiving selections to control the timing of incoming messages includes means for receiving a selection to hold all incoming communications until the user initiates a communication.

48. The system of claim 46 wherein the means for receiving selections to control the timing of incoming messages includes means for receiving a selection to hold all incoming communications for a predetermined time.

49. The system of claim 46 wherein the means for receiving selections to control the timing of incoming messages includes means for receiving a selection to hold all incoming communications until a communication of a predetermined priority is received.

* * * * *